United States Patent [19]

Miller

[11] 3,715,925

[45] Feb. 13, 1973

[54] MINIATURE RECORDING ALTIMETER
[76] Inventor: Ernest W. Miller, 20946 Northwood, Fairview Park, Ohio 44126
[22] Filed: Oct. 26, 1971
[21] Appl. No.: 192,168

[52] U.S. Cl. ..............................73/384, 73/4, 73/396
[51] Int. Cl. ................................................G01l 7/18
[58] Field of Search.............73/384, 385, 396, 406, 4

[56] References Cited

UNITED STATES PATENTS 2,003,439   2/1931   Hardy.....................................73/385

Primary Examiner—Donald O. Woodiel
Attorney—Wesley B. Taylor

[57] ABSTRACT

A recording altimeter is provided and particularly a miniaturized, compact altimeter adapted for use in flying amusement devices. The altimeter includes a pressure-sensitive system having gauge means, the entire system and gauge means normally being filled with an incompressible fluid such as an alcohol-water mixture. As the pressure outside of the altimeter decreases, part of the incompressible fluid is expelled from the gauge means. After the altimeter returns to original pressure conditions, the partial loss of water from the gauge means reflects a minimum pressure or pressure difference to which the altimeter has been subjected.

12 Claims, 4 Drawing Figures

PATENTED FEB 13 1973 3,715,925
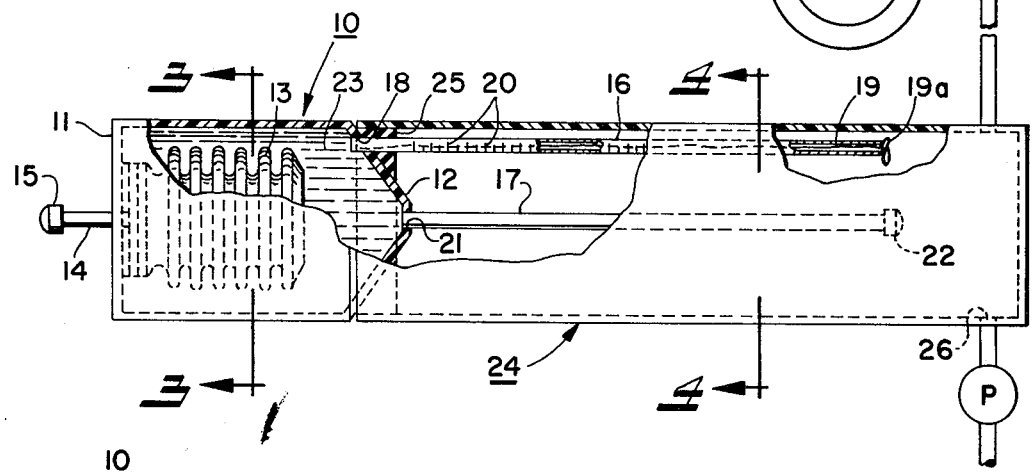
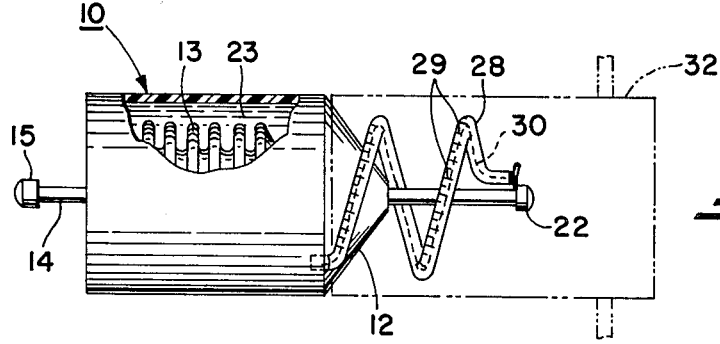
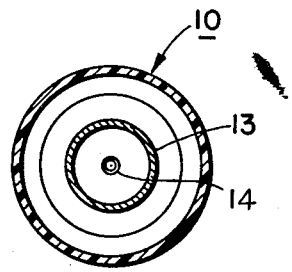
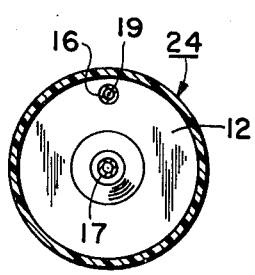

MINIATURE RECORDING ALTIMETER

BACKGROUND OF THE INVENTION

Various flying devices are commonly employed as sources of sport or pleasure, such as model airplanes, kites, model or toy rockets, and the like. Particularly in the case of certain relatively high flying devices, such as kites and model rockets, part of the sport is in seeing how high an altitude can be reached. Rockets are also used for training and for experimental work.

Small differential pressure measurements are commonly made with manometers, aneroid barometers, strain gauges, and other electrical-stress pressure transducers, and the like. However, all of these devices are relatively large, heavy, fragile, and expensive for use with flying toys of the type mentioned. This is especially true if the pressure-sensitive device is to possess the capability of recording a pressure measurement for subsequent or delayed reading or for providing a permanent record of the minimum pressure reached.

SUMMARY OF THE INVENTION

The present altimeter is of miniaturized form, light weight, and compact and records the maximum change in pressure to which it is subjected in flight. It is easily incorporated in flying devices of the type mentioned, specially in model rockets. Although the altimeter may weigh less than one ounce and measure as little as 0.5 inch in diameter, it is capable of recording a limiting value (minimum pressure in the case of altimeter applications) of even small atmospheric pressure differentials while withstanding relatively high and severe acceleration forces.

In one form, the present recording altimeter comprises a pressure-sensing chamber in which bellows are positioned and adapted to expand and contract in response to a decrease or increase, respectively, of the pressure therein. Tubular gauge means communicating with the pressure-sensing chamber extends therefrom, while an incompressible fluid normally entirely fills the chamber and gauge means. When the bellows expands, part of the incompressible fluid is expelled from the gauge means. Subsequent contraction of the bellows, as when it returns to original pressure conditions, retracts the incompressible fluid within the tubular gauge. That portion of the gauge tube which has been emptied of its incompressible fluid then provides a measure of the minimum pressure realized by the altimeter.

The altimeter preferably has closable vent means in the form of a tube to facilitate filling of the chamber and gauge means with the incompressible fluid. The gauge tube may be calibrated in units of pressure or altitude or still other reference scale. Calibration is accomplished by a jacket adapted to make a substantially air-tight connection with the pressure-sensing chamber about the gauge means. The calibration jacket has pressure-indicating means such as a manometer to indicate the pressure within the jacket during different degrees of evacuation. A pressure extant within the jacket is correlated with the amount of incompressible fluid lost by the gauge tube after the pressure-sensing chamber has returned to original pressure conditions.

BRIEF DESCRIPTION OF THE DRAWING

FIG. 1 is a side elevational view of one embodiment of the present recording altimeter semi-schematically illustrated in assembly with a calibration jacket, parts being broken away for purpose of illustration;

FIG. 2 is a side elevational view of a modified form of the altimeter in which the gauge tube is shown in spiral form; and FIGS. 3 and 4 are sections of FIG. 1 on the lines 3—3 and 4—4, respectively.

DESCRIPTION OF THE PREFERRED EMBODIMENTS

Referring to the drawing, the illustrated embodiment includes a pressure-sensing chamber 10 of tubular configuration having a closed end 11 and an opposed conically-shaped end 12 to assist in bleeding the chamber 10 of gas as hereinafter described. A bellows 13 in tube form having circumferential corrugations is closed at its right-hand end, as viewed in FIG. 1, and secured to the closed end 11 of the chamber at its opposed end. Any suitable glue or cement may be used to secure the bellows 13 to the chamber, for example, glues of epoxy resins. Or the bellows may be mechanically secured as by a threaded or frictionally fitting connection. Bellows 13 has a closable vent tube 14 leading from inside the bellows through its left-hand end, as viewed in FIG. 1, and through end 11 of the chamber to a point exterior of the altimeter. An airtight cap 15 closes the tip of vent tube 14 and, for this purpose, may make either a frictional seal with the tube 14 or a threaded connection.

While the bellows 10 may be fabricated from metal, for example brass, all of the remaining parts of the altimeter are preferably composed of plastics to contribute to the desired lightweight characteristic of the altimeter without undue sacrifice of strength. For example, the chamber 10, vent tube 14, and cap 15 as well as the other parts hereinafter described may be fabricated from such resins as polyethylene, polypropylene, polybutylene, nylon, the polyvinyl resins such as polyvinyl acetate, polyvinyl chloride, and polyvinyl butyral, nitrocellulose, cellulose acetate, polystyrene, polyesters, the polyacrylates such as polyacrylic acid, polymethacrylic acid, polyacrylic esters, and polymethacrylic esters, and the like. Known plasticizers can be incorporated in the resins to vary physical properties as may be desired.

Chamber 10 is closed except for a gauge tube 16 and a vent tube 17. Gauge tube 16 communicates with the interior of the chamber through an opening 18 in the slanting side of the conically-shaped end 12 and with which the tube has a frictional, air-tight fit. Gauge tube 17 may be calibrated in any desired units, but the units relate in some manner to pressure as hereinafter described. The units of calibration 20 may be placed directly on the tube 16 as shown, or a suitable calibrated backing scale may be mounted in juxtaposition alongside of tube 16 and support, for example, by the chamber 10. Subjecting the altimeter to shocks, either by shock waves or collisions, can cause a fluid in the gauge tube, hereinafter described, to separate at one or more places along the tube. This is prevented by a wire 19 which extends substantially through the length of the tube 16 and has a bend 19a at its exposed end to prevent all of the wire from entering the tube. The surface afforded by the wire within the tube 16 causes the fluid to run together and prevents separation. Vent tube 17 communicates with the interior of the chamber 10 through an opening 21 at the tip of the conically-shaped end 12 and has an air-tight fit with the opening. An airtight cap 22 closes the end of vent tube 17, either by a frictional or threaded fit as in the case of cap 15 and vent tube 14.

In use, chamber 10 and tubes 16 and 17 are completely filled with an incompressible fluid 23. Generally, any incompressible fluid and especially an incompressible liquid may be used, although the more viscous liquids and/or those having high surface tension tend to retain air bubbles. Ethyl alcohol is quite satisfactory for use as the incompressible fluid. When the altimeter is to be used as with toys for relatively young children, an alcohol-water mixture is preferred in which the alcohol is sufficiently diluted as to be neither toxic or flammable. For this purpose, vent tube 17 should extend from chamber 10 as far as gauge tube 16 does, so that the gauge tube can be entirely filled with the fluid. Preferably the fluid is liquid and colored to facilitate reading of the gauge tube 16. The fluid may be flowed through the gauge tube 16 into chamber 10 and then out vent tube 17. The conically-shaped end 12 of the chamber facilitates bleeding of any gas bubbles present and insures a complete filling of the parts mentioned. When the chamber and tubes are completely filled, cap 22 seals tube 17.

The unit is now ready for calibration. Cap 15 is temporarily removed to vent the bellows 13 to ambient pressure which then becomes the reference pressure for the altimeter. Tube 14 is then recapped. A calibration jacket 24 having an elastomeric ring seal 25 is fitted about the gauge tube 16 and against the conically-shaped end 12 of the chamber in an air-tight seal. Jacket 24 has an outlet port 26 through which it is evacuated as by a vacuum pump P. The jacket 24 is also connected to pressure-indicating means such as a conventional manometer 27.

As pump P decreases the pressure in jacket 24, bellows 13 expands, forcing incompressible fluid 23 from the end of the gauge tube 16. The evacuation is continued until a desired pressure reading on manometer 27 is obtained. The evacuation is then interrupted and original pressure conditions re-established, causing fluid 23 to be retracted along tube 16 and leaving an emptied portion of the tube. The meniscus of the remaining fluid in tube 16 is then marked and bears a correlation with the pressure within jacket 24 at the time the reading on manometer 27 was obtained. This process is repeated for other pressures in jacket 24 until a substantial length of the gauge tube 16 has been calibrated.

The calibrations 20 on tube 16 may thus correspond to inches or centimeters of mercury as indicated by the manometer 27. However, still other scales may be used. For example, the gauge tube 16 may be calibrated directly in units of elevation above the earth's surface with respect to the reference pressure in bellows 13. For this purpose, use is made of known tables and/or plotted curves which provide the elevation in feet, for example, above the earth's surface at that area of test for corresponding atmospheric pressures, as in the manner of the known aneroid barometer.

The unit is now ready for use. The calibrating jacket 24 is normally removed from chamber 10, but it can be left in place, with manometer 27 and pump P disconnected, as long as port 26 is open to the environmental pressure being measured. In any event, chamber 10 and tubes 16 and 17 are again completely refilled with fluid 23. After the recording altimeter has made a flight as part of a flying amusement device, such as a model rocket, the altimeter is recovered. Fluid will have been expelled from gauge tube 16 by reduced atmospheric pressure in the same manner that it was during calibration. Accordingly, the amount of fluid then remaining in tube 16 after the maximum reduction in outside pressure has occurred indicates on the calibrations 20 the extent of pressure decrease, or the altitude reached, or still other intelligence, depending on what scale and units tube 16 has been calibrated.

It is within the contemplation of the present invention to vary the relative positioning and shape of the gauge tube. FIG. 2 illustrates a modified form in which a pressure-sensing chamber 10, which may be identical to the corresponding chamber of the embodiment of FIG. 1, communicates with a gauge tube 28 extending from the chamber in spiral form and having a calibrated scale 29 on its outside, facing surface, and a wire 30 extending substantially through the length of the tube. A vent tube 31 reaching within the chamber may also be commensurately shortened. A calibration jacket shown in phantom at 32 may be used with the embodiment of FIG. 2 in a manner similar to that described for jacket 24.

In any embodiment, the length and inside diameter of the gauge tube are designed to optimize a range of measurement and the response time of the altimeter. Internal diameters of the gauge tubes may range from about 0.020 inch to about 0.060 inch which allows full scale readings ranging from about 6.0 inches to about 1.0 inch of gauge tube, respectively, measured along its length. The diameter of the sensing chamber 10 may vary from about 0.5 inch to about 1.5 inches, and the entire altimeter (excepting the calibration jacket) may weigh from about 0.25 ounce to about 1 ounce. Recording altimeters of the present invention within these dimensions and composed of the materials previously described have a sensitivity to differential pressures corresponding to altitudes above a reference point on the earth's surface of up to 5,000 feet within plus or minus 50 feet, while being insensitive to acceleration forces imposed, for instance, by rocket launches.

The present altimeter is capable of withstanding high and severe acceleration forces. Although the altimeter is particularly designed to function as a recording altimeter aboard model rockets, it is capable of recording the maximum low value of any small fluid differential pressures for which it has been calibrated and therefore may have still other uses, whether of toy or pleasure, commercial or industrial applications. In place of the bellows 13, a diaphragm may be used disposed transversely across the chamber 10 so as to divide it into a portion having the ambient reference pressure and another portion defining part of the system containing the incompressible fluid.

While the foregoing describes several embodiments of the present invention, it is understood that the invention may be practiced in still other forms within the scope of the following claims.

I claim:

1. A recording altimeter comprising a pressure-sensing chamber, pressure-responsive means positioned within said chamber and adapted to expand and contract in response to a decrease or increase, respectively, of pressure therein, hollow gauge means communicating with and extending from said chamber, and an incompressible fluid normally entirely filling said chamber and gauge means, whereby expansion of said pressure-responsive means expels incompressible fluid from said gauge means and subsequent contraction of said pressure-responsive means retracts said incompressible liquid, the resulting emptied portion of said gauge means being commensurate with the intervening change in pressure.

2. The recording altimeter of claim 1 in which said pressure-sensing chamber has closable vent means to facilitate filling of said chamber and gauge means with said incompressible fluid.

3. The recording altimeter of claim 1 in which said pressure-responsive means is a bellows.

4. The recording altimeter of claim 1 in which said pressure-responsive means is a bellows, and including closable vent means extending from said bellows to a point exterior of said pressure-sensing chamber and adapted to establish a reference pressure within said bellows.

5. The recording altimeter of claim 1 in which said hollow gauge means is a tube, said tube being calibrated in units of pressure.

6. The recording altimeter of claim 1 in which said hollow gauge means is a tube extending from said pressure-sensing chamber in spiral form.

7. The recording altimeter of claim 1 in which said incompressible fluid is a mixture of alcohol and water.

8. The recording altimeter of claim 1 in which said pressure-sensing chamber has a conically-shaped end portion terminating in closable vent means.

9. The recording altimeter of claim 1 in combination with a calibration jacket, said jacket making a substantially air-tight connection with said pressure-sensing chamber about said gauge means and being adapted for evacuation, and pressure-indicating means connected with said jacket for indicating the pressure therein.

10. The recording altimeter of claim 1 in which said pressure-responsive means is a bellows, said hollow gauge means is a tube calibrated in desired units of measurement, said pressure-sensing chamber having a conically-shaped end portion terminating in closable tubular vent means, said vent means facilitating filling of said chamber and gauge means with said incompressible liquid and extending from said chamber at least as far as said gauge tube so extends.

11. The recording altimeter of claim 1 having a miniaturized size weighing from about 0.25 ounce to about 1 ounce, and having a sensitivity to determine differential pressures corresponding to altitudes of up to 5,000 feet above the earth's surface.

12. The recording altimeter of claim 1 in which said hollow gauge means includes means therewithin for preventing separation of said incompressible fluid.

* * * * *